United States Patent [19]

Nissl

[11] Patent Number: 4,628,175
[45] Date of Patent: Dec. 9, 1986

[54] RESISTANCE WELDING EQUIPMENT HAVING AN OPTICAL ACCELEROMETER FOR MEASURING ELECTRODE ACCELERATION

[75] Inventor: Norbert Nissl, Aresing, Fed. Rep. of Germany

[73] Assignee: Messerschmitt-Bölkow-Blohm GmbH, Munich, Fed. Rep. of Germany

[21] Appl. No.: 698,699

[22] Filed: Feb. 6, 1985

[30] Foreign Application Priority Data

Feb. 10, 1984 [DE] Fed. Rep. of Germany ....... 3404692

[51] Int. Cl.⁴ .............................................. B23K 11/24
[52] U.S. Cl. ..................................... 219/110; 219/109
[58] Field of Search ................ 219/109, 110; 324/162, 324/175; 73/488, 517 R; 356/28, 28.5, 32

[56] References Cited

U.S. PATENT DOCUMENTS

| 4,083,254 | 4/1978 | Nissl | 73/517 R |
| 4,341,940 | 7/1982 | Defourny | 219/110 |
| 4,472,620 | 9/1984 | Nied | 219/110 |

FOREIGN PATENT DOCUMENTS 733916  5/1980  U.S.S.R. .............................. 219/109

Primary Examiner—Clifford C. Shaw
Attorney, Agent, or Firm—Kenyon & Kenyon

[57] ABSTRACT

An electrode for resistance pressure welding equipment having current control has frictionally connected thereto an optical accelerometer. The parts of the optical accelerometer as well as its optical signal leads are fabricated from electrically non-conductive and non-magnetic material.

17 Claims, 5 Drawing Figures

4,628,175

RESISTANCE WELDING EQUIPMENT HAVING AN OPTICAL ACCELEROMETER FOR MEASURING ELECTRODE ACCELERATION

FIELD OF INVENTION

This invention relates to an electrode having a device for measuring acceleration which is used with resistance pressure welding equipment with current control.

BACKGROUND OF THE INVENTION

DE-OS No. 30 25 515 discloses a method and apparatus for controlling resistance welding by means of a piezo-electric acceleration measuring device which is fastened to at least one of the two electrode holders. Accelerations which occur are preferably measured parallel to the axis of the electrode holder. In this known method, the magnitude of the electric current for the welding process is adjusted to the largest possible value, but below the value causing so-called welding splatter. The accelerations which occur at the electrode holder and which reach characteristically high values when welding splatter occurs are measured during the welding process for the purpose of electric current adjustment. If such acceleration peaks occur, the welding process is either interrupted or the magnitude of the current for the next welding process is reduced.

In tests with piezo-electric or other acceleration measuring devices which furnish an electrical measuring signal for current control, it was found that during the welding process and presumably due to the large currents and the magnetic field connected therewith, disturbances of the measuring signal occur which simulate accelerations. Such acceleration measuring devices are therefore not suitable for controlling the current during the welding process, for instance, by means of a phase gating control.

OBJECTS OF THE INVENTION

It is therefore an object of the present invention to provide an electrode with a device for measuring the acceleration during the welding process which is suitable for a resistance pressure welding equipment with current control.

These and other objects of the present invention will become apparent from the following description and claims in conjunction with the drawings.

SUMMARY OF THE INVENTION

In accordance with the present invention, an electrode for resistance pressure or compression welding equipment which has current control and a device for measuring acceleration is provided wherein the improvement comprises at least one optical accelerometer connected to the electrode in a force-locking manner. The optical accelerometer is suitably an opto-electrical accelerometer.

The optical accelerometer suitably comprises a housing and an optical acceleration responsive device or sensor fixedly disposed within a cavity of the housing. The housing containing the optical sensor would be connected to the electrode in a force-locking manner. Preferred embodiments of optical acceleration responsive sensors are hereinafter described in conjunction with FIGS. 2 and 3. An optical signal input lead and an optical signal output lead penetrate the housing and communicate with the optical acceleration responsive sensor. The opto-electrical transmitting, receiving, and signal-processing devices are placed at a certain distance from the electrodes, where the electromagnetic environment is not disturbing the measurement. The optical light guides, which connect the optical accelerometer to the above mentioned opto-electrical devices are insensitive to the electromagnetic environment.

By using an optical or opto-electrical accelerometer, it is possible to fabricate all components of the accelerometer connected to the electrode from electrically non-conductive and non-magnetic material so that even strong magnetic or electromagnetic fields have no influence on the measuring signal. For this reason, it also becomes possible to connect the optical accelerometer directly to the electrode and it is no longer necessary to connect the accelerometer to the electrode holder as is done in the apparatus disclosed in DE-OS No. 30 25 515 or to attach it to parts further removed from the location of the weld. The present invention is very advantageous because the closer the acceleration measurement is made to the actual point of the weld, the more accurate is the acceleration measurement and therefore, the current regulation.

BRIEF DESCRIPTION OF THE DRAWINGS

In the drawings forming part hereof wherein like reference numerals indicate like parts.

DETAILED DESCRIPTION

In order to afford a more complete understanding of the present invention and an appreciation of its advantages, a detailed description of preferred embodiments is presented below in conjunction with the drawings.

Figure 1A:
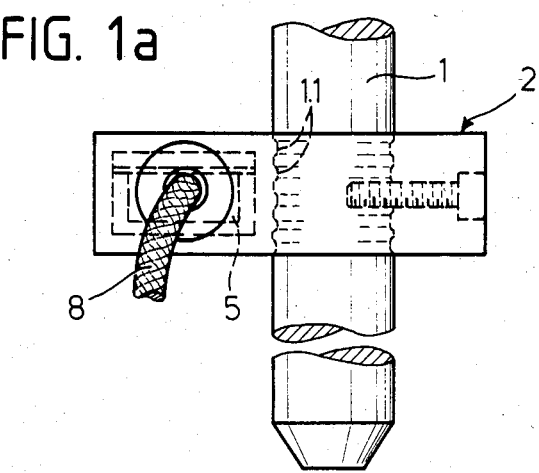
FIG. 1a is a schematic side view of an electrode having an optical accelerometer frictionally connected thereto in accordance with the present invention.
Figure 1B:
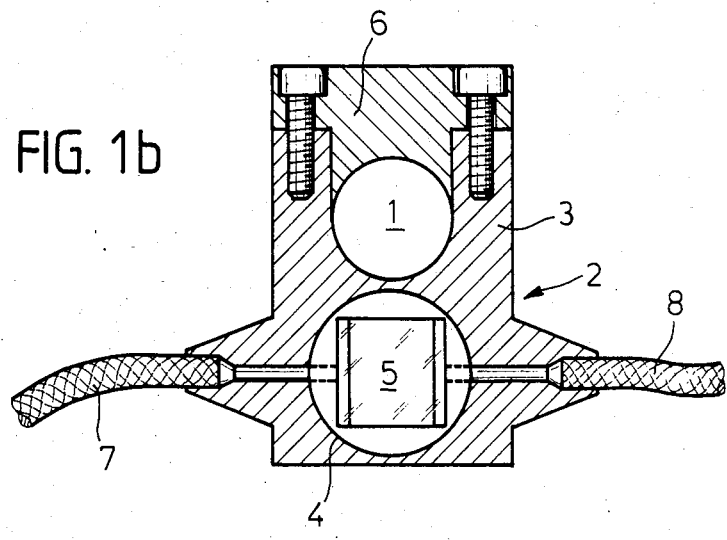
FIG. 1b is a schematic view, partially in cross-section, of a housing containing an optical acceleration responsive sensor with the housing connected to an electrode, all in accordance with the present invention.
Figure 1C:
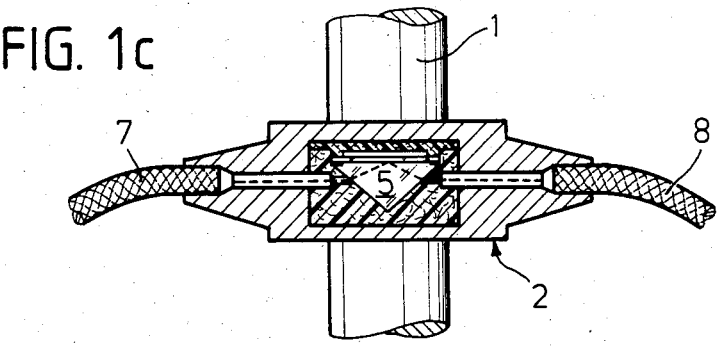
FIG. 1c is another schematic view, partially in cross-section, of a housing containing an optical acceleration responsive sensor with the housing connected to an electrode, all in accordance with the present invention.

FIG. 1a illustrates a side view of an electrode 1 which is connected to an optical accelerometer 2 in a positive force transmitting manner. The accelerometer 2 comprises a two-part housing fabricated from fiberglass-reinforced, high-strength plastic. With reference to FIG. 1b, one part 3 of the housing has an optical sensor 5 which is responsive to acceleration disposed in a cylindrical interior cavity 4. The detailed design of the optical sensor 5 which is responsive to acceleration will be hereinafter described with reference to FIGS. 2 and 3.

The housing comprises part 3 and counterpiece 6. A force-transmitting connection of the housing to the electrode 1 is provided by clamping the electrode between the parts 3 and 6. The housing parts 3 and 6 are advantageously connected to the electrode by cementing in conjunction with the use of plastic screws as illustrated in FIG. 1b. A form fit with the electrode 1 is advantageously brought about by the electrode having grooves 1.1 in the vicinity of the fastening to the housing. The grooves 1.1 may engage corresponding grooves in the housing parts 3 and 6 or the grooves 1.1 may be pressed into these parts when the screws are tightened. This aids the cement joint. The grooves 1.1 may be prismatic groovings. It is advantageous if the thermal expansion coefficient of the electrode material and the thermal expansion coefficient of the portion of the housing contacting the electrode are approximately equal. It is further advantageous if the optical accelerometer is fabricated from materials having a small thermal expansion coefficient.

As illustrated in FIG. 1b, light guides 7 and 8 penetrate housing part 3 through holes and enter the interior 4 and they communicate with the optical sensor 5. The light guide 7 serves as a transmitter light guide and is connected to an opto-electrical transmitting device (not illustrated) which is well known per se and thus is not described in detail. The light entering through the transmitter light guide 7 is modulated by the optical sensor 5 as a function of the acceleration and is fed by the receiving light guide 8 to a opto-electrical receiving and signal processing device (not illustrated) which is likewise well known per se and thus not described in detail. This device generates an acceleration-dependent control for a regulating signal for the current control of the pressure welding equipment during the welding process. Current control in pressure welding equipment responsive to an acceleration generated signal is known in the art as has been hereinbefore discussed.

The opto-electrical transmitting, receiving, and signal-processing devices are adantageously electrically and magnetically shielded. For two electrode devices, the accelerometers of the two electrodes are suitably matched and adjusted to each other in pairs. The measuring axis of the optical sensor 5 in the illustrated embodiment is parallel to the direction of the longitudinal electrode axis. If desired, the measuring axis of the sensor 5 may be placed perpendicular to the direction of the longitudinal electrode axis.

The interior 4 of the housing part 3, as well as the light guides 7 and 8 along with their connections to the housing part 3 are designed hermetically tight and resistant against contamination occurring during industrial welding. They likewise can be provided with a protective coating against mechanical and thermal influences. If plastic and glass material are used for the fabrication of the accelerometer 2, sufficiently high resonance frequencies are obtained so that the desired signal can be measured without distortion. The frequency of the desired signal, i.e. the frequency of the accelerations that occur, is typically several hundred Hz, while the resonance frequencies of the parts of the accelerometer 2 are typically above 10 kHz. The dynamic range of the sensor 5, which is hereinafter described, typically covers plus or minus 1000 g (g=the earth's gravity), whereby the average amplitude of the desired signal of approximately 50 g as well as the striking of the electrode on a work piece with approximately 600 g is covered.

Figure 2:
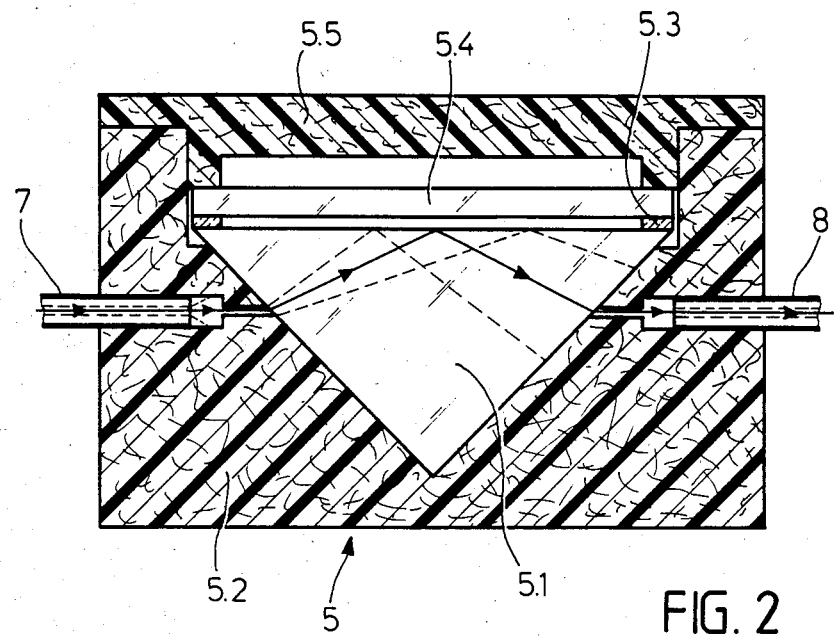
FIG. 2 schematically illustrates, partially in cross-section, an optical acceleration responsive sensor used in the optical accelerometer of FIGS. 1a, 1b, and 1c.

The sensor 5 which is illustrated in FIG. 2 and which is firmly anchored in the interior 4 of the housing part 3 is in principle known from German Pat. No. 26 20 914 and is based on the so-called Goos-Haenchen effect which consists in that at the fringes of a finite optical wave field, refraction effects occur in the case of total reflection at the boundary between an optically denser and an optically thinner medium which cause a transfer of energy into the optically thinner medium. This energy then propagages within a few wavelengths distance from the denser medium as a surface wave parallel to the boundary surface, and passes at the opposite edge zone of the wave field back into the optically denser medium, so that overall, total reflection of the energy occurs. If a body which is capable of deflecting or absorbing the surface wave is brought from the optically thinner medium, the total reflection is disturbed and this the more, the closer the body is brought to the boundary surface. Thus, modulation of the light reflected in the denser medium by, for instance, elastic excursion of a body located within a few wavelengths from the boundary surface is possible.

In the embodiment illustrated in FIG. 2, the light emerging from the transmitter light guide is refracted into a rectangular prism 5.1 which is supported or embedded in a correspondingly shaped plastic housing 5.2. After total reflection of the light beam at the hypotenuse of the prism 5.1, the light strikes the opposite cathesus and is refracted at the latter from the prism and fed, in part, into the receiving light guide 8 through which it is fed to the optoelectrical receiving and signal processing device.

A glass plate 5.4 attached by means of a spacer layer 5.3, for instance of fused silica vapor deposited on the hypotenuse, at a distance of about two wavelengths of the light used. Glass plate 5.4 represents, from a mechanical point of view, approximately a supported beam firmly clamped at the ends. This beam is bent up or down in the case of accelerations occurring perpendicularly to the hypotenuse, in accordance with its mechanical parameters, and thereby increases or decreases the gap between the glass plate 5.4 and the hypotenuse of the prism 5.1. Thereby, the degree of "total reflection" is increased or decreased accordingly, starting with a factor of total reflection which is already correspondingly reduced by the choice of the basic gap width. Zero adjustment and optionally desired linearity is achieved in this case by appropriate signal processing in the optoelectrical signal processing device.

The surface quality of the hypotenuse of the prism 5.1 and the side of the glass plate 5.4 facing the gap is chosen as about ¼ of the wavelength of the light used.

The residual divergence of the light beam (shown dashed) caused by corresponding aperture holes in front of the light emission surface of the transmitting light guide 7 has a positive effect in the form of less sensitivity of the structure to assembly tolerances. For this purpose, the receiving light guide 8 can also be preceded by a ground-glass structure which has an area-integrating effect. In order to prevent contamination of the gap between the glass plate 5.4 and the prism 5.1, a lid 5.5 hermetically sealing the housing 5.1 is provided. In addition, the enclosed interior can be evacuated at least partially or be filled with a dry inert gas.

Figure 3:
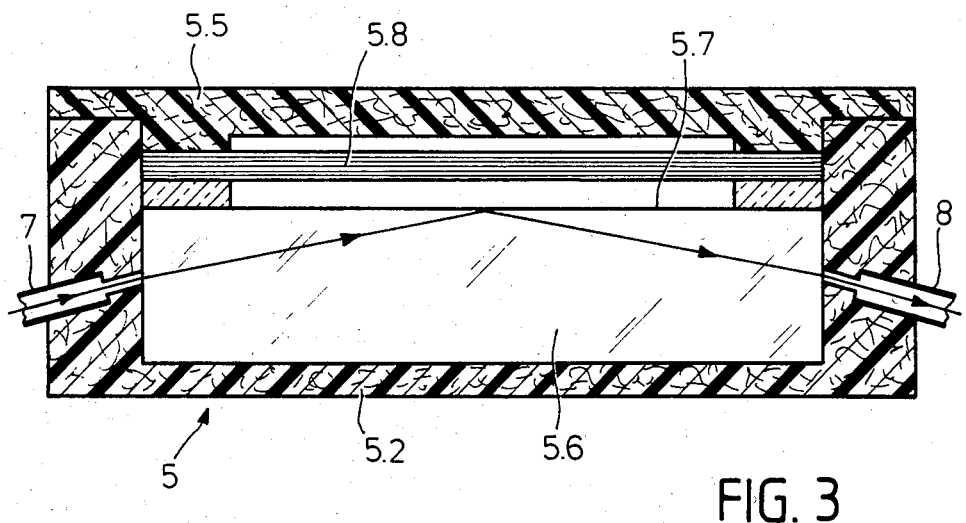
FIG. 3 schematically illustrates, partially in cross-section, an another embodiment of optical acceleration responsive sensor useful in an optical accelerometer in accordance with the present invention.

Another example of an optical sensor suitable for the acceleration measurement of the invention is illustrated in FIG. 3. In this embodiment, a slab-like glass block 5.6, instead of a prism, is embedded in a correspondingly shaped housing 5.2. The transmitting and receiving light guides 7 and 8 are attached on both sides of the housing at an oblique angle to the side surfaces of the glass block in such a manner that total reflection is brought about at the surface 5.7 of the glass block. At the same distance as in the embodiment according to FIG. 2, a beam 5.8, for instance of plastic, is arranged above this surface 5.7 and which bends under the influence of acceleration forces and changes the gap width between the beam surface facing the glass bock 5.6 and the surface 5.7 of the glass block 5.6. Also in this case, the housing 5.2 is sealed hermetically tight by a lid 5.5.

Although preferred embodiments of the present invention have been described in detail, it is appreciated that modifications may be made by those skilled in the art all within the spirit and scope of the present invention as defined in the claims.

What is claimed is:

1. In a resistance pressure welding device having an electrode, means for measuring the acceleration of said electrode, and means for controlling the welding current responsive to the measured acceleration, the improvement comprising:
    said acceleration measuring means comprises at least one optical accelerometer, and
    means clamping said optical accelerometer directly onto said electrode in a force-locking manner.

2. A device according to claim 1 wherein said optical accelerometer includes a housing and an optical sensor responsive to acceleration supported within said housing, said electrode has an exterior, and said clamping means connects said housing to the exterior of said electrode in a force-locking manner.

3. A device according to claim 2 further including an optical signal input lead penetrating said housing and communicating with said optical sensor, and an optical signal output lead penetrating said housing and communicating with said optical sensor.

4. A device according to claim 3 wherein said optical accelerometer, said input lead, and said output lead are fabricated from electrical non-conductive and non-magnetic material.

5. A device according to claim 3 wherein said input lead and said output lead are light guides.

6. A device according to claim 3 wherein the exterior of said housing, said input lead and said output lead are provided with a coating protective against mechanical and thermal influences.

7. A device according to claim 2 wherein said housing is fabricated from fiber-reinforced plastic.

8. A device according to claim 2 wherein said accelerometer housing is connected to said electrode by a form fit.

9. A device according to claim 2 wherein said electrode has grooves on the surface thereof engaging said housing to provide said connection.

10. A device according to claim 2 wherein said housing is cemented to said electrode.

11. A device according to claim 2 wherein the thermal expansion coefficient of the electrode material and the thermal expansion coefficient of the portion of the housing contacting said electrode are approximately equal.

12. A device according to claim 2 wherein said optical accelerometer is fabricated from materials having a small thermal expansion coefficient.

13. A device according to claim 2 wherein said housing is sealed air tight against the outside atmosphere and has an interior cavity containing said optical sensor which is evacuated.

14. A device according to claim 2 wherein said housing is sealed air tight against the outside atmosphere and has an interior cavity containing said optical sensor which is filled with a dry inert gas.

15. A device according to claim 2 wherein said optical sensor is aligned to measure acceleration parallel to the longitudinal axis of the electrode.

16. A device according to claim 2 wherein said optical sensor is aligned to measure acceleration perpendicular to the longitudinal axis of the electrode.

17. A device according to claim 1 wherein said optical accelerometer is located external to said electrode.

* * * * *